(12) United States Patent
Van Schie (10) Patent No.: US 6,287,460 B1
(45) Date of Patent: Sep. 11, 2001

(54) DEVICE FOR CONTINUOUSLY SKIMMING OFF A TOP LAYER (75) Inventor: Lodewijk Van Schie, Vlijmen (NL)

(73) Assignee: Suparator USA, Inc., South Salem, NY (US)

( * ) Notice: Subject to any disclaimer, the term of this patent is extended or adjusted under 35 U.S.C. 154(b) by 0 days.

(21) Appl. No.: 09/529,457

(22) PCT Filed: Oct. 12, 1998

(86) PCT No.: PCT/NL98/00585

§ 371 Date: Apr. 12, 2000

§ 102(e) Date: Apr. 12, 2000

(87) PCT Pub. No.: WO99/19040

PCT Pub. Date: Apr. 22, 1999

(30) Foreign Application Priority Data

Oct. 13, 1997 (NL) .................................................. 1007260
May 4, 1998 (NL) .................................................. 1009055

(51) Int. Cl.[7] ...................................................... C02F 1/40
(52) U.S. Cl. ........................ 210/122; 210/242.3; 210/540
(58) Field of Search ................................ 210/122, 242.1, 210/242.3, 525, 540

(56) References Cited

U.S. PATENT DOCUMENTS

| 836,335 | * | 11/1906 | Nichols | 210/242.1 |
|---|---|---|---|---|
| 1,032,458 | * | 7/1912 | White | 210/242.3 |
| 2,608,300 | * | 8/1952 | Small . | |
| 2,858,843 | * | 11/1958 | Muller | 210/122 |
| 3,237,774 | * | 3/1966 | Schuback | 210/242.3 |
| 3,688,909 | * | 9/1972 | Titus et al. | 210/242.3 |
| 4,288,324 | * | 9/1981 | Urdanalt | 210/242.1 |
| 4,405,458 | | 9/1983 | McHugh, Jr. . | |
| 4,608,165 | | 8/1986 | Galper . | |
| 5,236,585 | * | 8/1993 | Fink | 210/242.3 |
| 5,498,348 | | 3/1996 | Plink et al. . | |
| 5,580,450 | * | 12/1996 | Lombas et al. | 210/242.3 |
| 5,679,265 | | 10/1997 | Van Schie . | |
| 5,830,335 | * | 11/1998 | Harris | 210/540 |

FOREIGN PATENT DOCUMENTS

| 3405468A1 | | 8/1985 | (DE) . |
|---|---|---|---|
| 19512279A1 | | 10/1996 | (DE) . |
| 128122 | * | 12/1984 | (EP) . |
| 2006037 | * | 5/1979 | (GB) . |
| 1553758 | | 3/1994 | (GB) . |
| WO94/04464 | | 3/1994 | (WO) . |

* cited by examiner

Primary Examiner—Christopher Upton
(74) Attorney, Agent, or Firm—Dennis G. LaPointe; Mason & Associates, PA (57) ABSTRACT In an apparatus for continually skimming off a top layer of a body of liquid, the apparatus having a self-adjusting collecting container with two opposite sidewalls, a rear wall, and a bottom surface, including a discharge means, wherein the collecting container has a leading edge over which the top layer flows into the collecting container, which top layer is removable through said discharge means and wherein a combined weight of the top layer skimmed into the collecting container causes the collecting container to seek an effective balanced position for collecting the top layer, the apparatus further including a pipe about which the collecting container is mounted tiltably. The pipe is aligned with an axis of rotation of the collecting container. The pipe is further connected to the discharge means inside the collecting container, and the pipe and the collecting container are capable of independent movement.

23 Claims, 8 Drawing Sheets

DEVICE FOR CONTINUOUSLY SKIMMING OFF A TOP LAYER

BACKGROUND OF THE INVENTION

1. Field of the Invention

This invention relates generally to devices for continuously skimming off the top polluted layer from aqueous media. More particularly, this invention relates to a device for continuously skimming off oil, grease, or comparable substances from waste water, aqueous cleaner, machine coolant, etc.

2. Description of the Prior Art

Surface weirs have long had widespread use as a means of controlling or measuring liquid flow rates. They are used in devices to skim liquid surfaces of unwanted materials and also in apparatus for separation of liquids having different densities. Chemical manufacturing processes, water treatment process, waste treatment processes and water pollution cleanup operations all use separating, flow regulating or skimming devices.

There are a variety of skimming devices in the prior art. One such skimmer is a weir skimmer, which typically comprises a barrier wall of adjustable height which allows oil floating on water to flow over the wall and into a collection trough while excluding water. Recovered oil is then continuously pumped from the collection trough to a storage or transport means. Weir skimmers operate well in calm water with large or contained spills which produce a relatively thick oil layer.

Disc skimmers ordinarily include a plurality of discs spaced apart coaxially along a rotating shaft which is supported by floats to position the lower portion of the discs in the water. Oil contacts and adheres to the rotating discs and is removed by blades or wipers which direct the collected oil into a sump or other collection means.

Drum skimmers have also been used for removal of oil and other hydrocarbons from water surfaces. A drum skimmer consists of one or more large rollers, or drums, which rotate partly submerged in water. Oil attaches to the drum surface as the drum rotates through the oil-water interface. The attached oil is then removed by squeezing or scraping the oil from the drum surface.

Most of the weir devices in use as separating, regulating or skimming apparatus are somewhat limited in operation and applications. One such device is disclosed in U.S. Pat. No. 4,405,458 to McHugh, Jr. which can be mounted in a fixed installation, such as a connection to a standpipe or as a floating unit. The unit utilizes a float supported weir that is unattached to the apparatus, except for contact with an adjustable retainer, which sets the weir elevation and flow rate.

The pivoting weir is mounted within a close fitting guide collar which guides weir movement and provides a practical or liquid seal between these members. The liquid seal provides a lubricating film to insure free vertical movement. The unit responds to flow interruptions caused by disturbances or variations in the flow rate of the piping system connected to the unit. Flow rate fluctuations result in the lowering of the inside liquid level and a corresponding lowering of the weir edge.

U.S. Pat. No. 5,498,348 to Plink et al. discloses a mobile floating surface skimmer comprising a vessel having an inlet through which liquid from the surface of the body of liquid can flow into the vessel together with the debris and/or contaminants. An outlet is connected to a pump for removing liquid, together with the debris and/or contaminants from the vessel. A valve controls the flow of liquid into the vessel in response to the level of the liquid to maintain the inlet near the surface of body of the liquid wherein the valve is provided with a delayed response to cause the skimmer to oscillate vertically in the body of liquid so the debris is prevented from becoming lodged at the inlet.

German patent DE 19512279 A1 to Becker discloses a device which is constructed such that the device rotates about an axis of rotation, however, the discharge means is connected rigidly to the collecting container. The discharge means is a hose which significantly influences the position of the container itself, relative to the top floating layer that is to be removed. Since the force exercised on the collecting container by the discharge hose is not only dependent on the weight of the hose, but alsoon the contents of the hose, the operation of the device is problematic in many applications. In addition, the German patent device functions discontinuously, in that it rocks back and forth, filling up with fluid in the forward position and discharging at the backward position. Further, this device can only be used in conjunction with floating elements, while the present invention can be used without the use of floating elements, that is, the discharge pipe can be mounted into the side of a tank containing the liquid media. The device described in the German patent can not be used in this manner.

None of the above prior art device are as effective in cleaning up large areas as the instant invention or they are more complex devices which are more expensive to manufacture and to maintain. More importantly, none of the prior art devices are structured such that the discharge or suction line acts as a rotatable axis about which the collecting container rotates and self-adjust, a novel important which significantly distinguishes the present invention over the prior devices.

The invention therefore relates to a device for continuously skimming off a floating top layer, e.g. a layer of oil or grease upon a flow of waste water, by means of a floating collecting container of which the edge being self-adjustable according to the height of the floating top layer to be skimmed off, wherein the suction or discharge pipe emanating from the side of a collecting container is aligned with and thereby acts as a rotable axis for the container.

With these kind of devices the floating top layer is actually skimmed off and the component which is skimmed off, e.g. oil, is discharged through the collecting container. Here the problem occurs in maintaining continuous correct angular adjustment of the skimmimg edge of the collecting container during continuous out and inflow of the skimmed off component from and to the collecting container. The invention now provides in a self adjusting device of this kind in which the edge of the collecting container is continuously directed at the height level of the liquid surface and the collecting container is not subjected to vertical displacement but instead the self adjustment in relation to the height level of the liquid to be skimmed off is realized only by means of the tilting movement of the collecting container. This self-adjusting device when modified with the novel features described below regarding the axially aligned discharge pipe's incorporation into the collecting container provides a demonstable improved efficiency in the skimming off of floating top layers.

SUMMARY OF THE INVENTION

The present invention provides a system for recovering matter such as oils or petroleum products or comparable substances, or even water, from the surfaces of bodies of liquid media. In this manner, any matter desired to be removed can be skimmed off, together with more or less of the liquid media, and the build up of floating top layers is inhibited. The skimming vessel or collecting container can swivel freely about the suction pipe which has a longitudinal axis which aligns with and acts as the axis of rotation of the collecting container. Variations in level and flow can be followed over a wide range while continuously removing an adjustable volume of fluid.

The principle of the invention is that the skimmer or collecting container, which by itself is prior art, is adapted to rotate over or about an effluent pipe. In operation, the collecting container will swivel back and forth about the axis through its asymmetrical tilting self-adjustment evolutions. The direction, and the angle of the swiveling movement results from the difference between the incoming flow into the vessel and the flow out through the effluent pipe. The construction provides a self-adjusting, stable system which is sensitive to flow and liquid level variations. Prior art devices use discharge means which are not connected to the container such as a hose inserted into the container or the discharge means is connected to the container in such a way that it restricts movement of the container, that is, the discharge means, which can be a pipe or hose, is not in operational engagement with the collecting container such that they act independently. Therefore prior art devices incorporating known discharge means are inefficient. The axial alignment of the discharge pipe which is independently operationally engaged with the collecting container of the present invention eliminates this restriction of movement. The present invention further includes bearing means at the point of entry of the discharge pipe into the sidewall of the collecting container that allows a circumferential tolerance gap or clearance between the bearing means, which can be a suitable friction reducing bearing such as a Teflon®, nylon or other suitable polymeric material, and the discharge pipe. The bearing may be in the form of an annular coupling attached to the sidewall of the container such that the aperture in the sidewall of the container is greater than the inside diameter of the bearing. In turn, it is preferred that the outside diameter of the discharge pipe entering the sidewall also be slightly less than the inside diameter of the bearing to provide for a circumferential gap that allows the liquid media to penetrate the gap into the collecting container, thereby promoting the relative frictionless movement or uninhibited rotation of the collecting container about the discharge pipe acting as the axis of rotation. In order to maintain its generally longitudinal orientation within the container and at the same time preventing the discharge pipe from axially displacing itself by coming out of the sidewall of the container, the opposite end of the discharge pipe is loosely and axially connected to the opposite sidewall of the container in a manner that also allows for free rotation of the opposite sidewall about the discharge pipe and further allows for a circumferential tolerance gap or predetermined clearance to allow liquid media to enter the collecting container. It is also an object of the invention to provide a gap sufficient to allow contaminants suspended in the fluid media to enter the collecting container through the gap spacing between the bearing and the discharge pipe. This feature prevents contaminants from settling around the joint area and inhibiting the free movement of the collecting container about the discharge pipe.

More specifically, the collecting container is mounted around a fixed horizontal tiltable axis, which consists of a discharge pipe through which the inflowing floating top layer to the collecting container is discharged and in which the edge of the collecting container is not subjected to vertical displacement when the delivery of the inflow of the floating top layer changes, but instead continuously remains at the same position in height level of the floating top layer as previously adjusted in the collecting container, means being provided for continuously redirecting a possibly occurring unbalance of the collecting container, e.g. as a result of a change in weight of the delivery immediately and critically into an increasing or decreasing discharge through the discharge pipe. This may be realized by means of a suction pump or by adjusting the quantity of the floating top layer to be discharged by means of an appropriate discharging valve.

Basically a collecting container is provided with a tiltable axis which is preferably rotatably supported in the wall of a tank, basin, gutter, or other enclosure that holds the liquid media from which the floating matter is to be separated. In a particularly favourable embodiment according to the invention this axis itself adopts its shape from a round discharge pipe around which the collecting container, provided with a counterweight mass, is mounted tiltably. It is the purpose to give the collecting container such a pre-adjustment that the desired. position in height level of the floating top layer is maintained continuously.

Within the scope of the invention it is also provided that the collecting container is suspended tiltably in a floating element which floats upon the liquid flow thus giving an automatic adjustment to the angular position of the collecting container, in particular to the levelled position of its edge, corresponding to the adjustment which is realized by means of a counterweight mass, particularly by altering the position of the counterweight mass in relation to the axis.

When using a relatively large floating element, an embodiment according to the invention can be selected in which on either side of the central floating element a self adjusting edge is mounted. A self adjusting collecting container may serve as a width module for a floating top layer component to be separated, which is supplied to the collecting container over an extended width of the surface. Or the self adjusting collecting container may realized, by means of a self moving floating element, the height level position of the skimming off operation in relation to the liquid level of the floating top layer.

For self adjustment of the correct angular position of the tilting operation with which optimal skimming off is realized by means of the edge on the collecting container, it is on the one hand imperative that the edge of the collecting container is firstly, e.g. by hand, adjusted up to a certain height level for skimming off. When using that pre-adjustment a certain volume of the skimmed off floating top layer component will flow into the collecting container, which causes, depending on the construction of the collecting container and as a result of all active forces, a moment of rotation, which causes a further tendency to raise the edge in a direction above the surface level of the liquid.

If that would negatively exceed the adjusted level of skimming off of the floating top layer than the floating top layer will be skimmed off to a lesser extent or even not at all.

In order to maintain the pre-adjusted height level of skimming off optimally under all circumstances, according to the invention there is also provided a liquid discharge system, e.g. by means of a pump and adjustable or regulating valve by which, while avoiding some overcorrection, the entire collecting container, as a result, is continuously maintained in such a balanced position that once a carefully adjusted optimal skimming off level is realized, it is maintained under all circumstances.

Next to the aforementioned technical balancing by using an adjustable counterweight mass, which may be angularly mounted in relation to the axis of the collecting container for pumping or displacing, subject to a correct adjustable velocity of the quantity of the skimmed off floating top layer component from the collecting container, the balancing system may also be provided with optical and/or mechanical sensor means. The latter are meant to maintain the fixedly adjusted position of the edge in order to guarantee an efficient discharge.

With known devices the problem occurs that a complete and controlled discharge of the floating top layer cannot be achieved in a single skimming off operation without carrying along with it substantial quantities of waste water. The invention now may overcome this problem by the application of a device in which a container for skimming off, which mainly consists of a flat bottom part, directing to the layer to be skimmed off, having connecting side walls, and a rear wall in which the container for skimming off at its bottom side merges into a recessed part in which a discharge pipe is mounted, provided with an aperture, in such a way that the container is tiltable around the pipe, in which the direction of and the extent of tilt is determined by the difference between the quantity of the inflowing (skimmed off) layer into the container and the quantity which is discharged through the pipe. By doing so the device provides for a self adjusting stabilized system which automatically adapts itself to fluctuations in the height level of the liquid or the delivered volume.

In a preferable embodiment which guarantees the automatic adaptation of the device, a discharge pipe is supported in the side walls of the recessed part of the container for skimming off and the aperture, which is provided in the discharge pipe extends longitudinally between these side walls.

For achieving optimal tilting movements of the container, in a favorable embodiment according to the invention the container for skimming off is on one side wall provided with a bearing and sealing ring to which also the discharge pipe is made attachable.

This makes it now possible that, in relation to the container, a protruding portion of the discharge pipe serves as a connecting sleeve e.g. to be coupled to a flexible discharge pipe of which the end portion may be mounted in a button end against the sliding ring without any friction, so as not to hinder the tilting movement of the skimming off container thereby.

Another favorable embodiment of the device according to the invention is characterized in that one or more additional weight masses may be mounted to the skimming off container by which the extent of tilting movements may be altered.

According to the invention the embodiment is preferred in which an adjustable counterweight mass is mounted to the recessed part of the container by which the extent and direction of tilting movements of the container may be adapted efficiently in the event of extraordinary liquid height levels.

Another embodiment of the invention is a device for continuously skimming off a floating top layer, e.g. a layer of oil or grease upon a flow of waste water, by means of a movable and floating skimming off container, characterized in that one or several skimming off containers are tiltably connected to a floating element. A favorable characteristic is that on either side of a floating element skimming off containers are tiltably connected to their discharge pipes with the floating element. Advantageous is the embodiment according to the invention which is characterized in that a floating element has a regular shape with a junction contact underneath for connecting a pipe for discharging inflowing skimmed layers in the floating element from the containers.

Another embodiment according to the invention is a device for continuously skimming off a floating top layer, e.g. a layer of oil or grease upon a flow of waste water, by means of a movable and floating skimming off container, characterized in that on either side of a skimming off container several floating elements are attached to the skimming off container. Thereby it is advantageous that the skimming off container is adjustably mounted to the floating elements.

This invention relates to the above features and objects individually and in combination. Other objects, features and advantages of the present invention will be apparent from the following description of preferred embodiments thereof and from the attached drawings.

In FIGS. 1–4, the construction of a collecting container 1 includes a raised rear wall 2, a bottom plate 3 with an overflow edge 4 and triangular side walls 5 and 6. The inflow direction of the floating top layer is indicated by the arrows A. The collecting container 1 is mounted tiltable on a hollow pipe 7 which also serves as discharge for the floating top layer. To the right in FIG. 1 the pipe 7 may be attached sealingly and rotatably in a desired position in relation to the collecting container 1 by means of a teflon threaded ring nut, in such a way, that with an adjusted fixed position of the collecting container 1 around the pipe 7, this pipe 7 itself is supported in a tiltable manner in the two opposed walls of a flow discharge gutter, through which the liquid flows which must be purified from a floating top layer (e.g. oil, grease or similar substances. The position of the edge 4 for skimming off is adjusted in this way, in which the collecting container 1 is made tiltable around the fixed discharge pipe 7.

The collecting container 1 furthermore is provided with a pipe guide or bearing means 9 (see FIG. 1) and the discharge pipe 7, around which this pipe guide 9 can tilt, is provided longitudinally with an aperture or slot 10 on the upper side and inside of the collecting container 1. Aperture 10 opening may be provided in the form of a slot, one or more slots, or a plurality of holes. Bearing means 9 at the point of entry of the discharge pipe 7 into the sidewall 6 of the collecting container 1 is adapted to allow for a tolerance gap or clearance 90 between the bearing means 9, which can be a suitable friction reducing bearing such as a Teflon®, nylon or other suitable polymeric material, and the discharge pipe 7. The bearing means 9 may be in the form of an annular coupling attached to the sidewall 6 of the container 1 such that the aperture in the sidewall 6 of the container 1 is greater than the inside diameter of the bearing means 9. In turn, it is preferred that the outside diameter of the discharge pipe 7 entering the sidewall 6 also be slightly less than the inside diameter of the bearing means 9 to provide for a tolerance gap or clearance 90 that allows the liquid media to penetrate into the collecting container 1, thereby promoting the relative frictionless movement or uninhibited rotation of the collecting container 1 about the discharge pipe 7 acting as the axis 15 of rotation. In order to maintain its generally longitudinal orientation within the container 1 and at the same time preventing the discharge pipe 7 from axially displacing itself by coming out of the sidewall 6 of the container 1, the opposite end of the discharge pipe 7 extending within the container 1 is loosely and axially connected to the opposite sidewall 5 of the container 1 in a manner that also allows for free rotation of the opposite sidewall 5 about the axis 15 of the discharge pipe 7 and further allows for a tolerance gap or clearance 90 to allow liquid media to enter the collecting container 1. Gap 90 is sufficient to allow contaminants suspended in the fluid media to enter the collecting container 1 through the gap 90 spacing between the bearing means 9 and the discharge pipe 7, as well as through the opposite sidewall 5 gap 90. This feature prevents contaminants from settling around the joint area and inhibiting the free movement of the collecting container 1 about the discharge pipe 7. Of course, when a collecting container 1 is really short in width, the discharge pipe 7 extending into the collecting container 1 need not extend and engage with the opposite sidewall 5. The inflowing floating top layer may easily be discharged further through this longitudinal aperture 10 and the discharge pipe 11 by means of a suction pump (not shown) in the direction of arrow B. In the illustrated position the discharge pipe 11 is not located in the axial extension of the discharge pipe 7 but instead both pipes 7 and 11 are connected by a coupling 12. It is clear that the collecting container 1 can tilt or rock around the axis of the discharge pipe 7 if the weight volume of the floating top layer in the collecting container 1 becomes so great that a tendency to rotate in the direction of arrow C occurs. In that event the edge 4 on the collecting container 1 would be raised beyond the adjusted height level of the floating top layer and so the separation of the floating top layer would become obstructed. Now by increasing the pump volume, or in the event of discharge by gravity, increasing the opening of the half open shut off valve (not shown), the upward tendency for rotation of the collecting container 1 may be brought in balance with the optimum position of the edge 4, thus realizing the self adjustment of the system. The self adjustment by discharge may, inter alea, be controlled by altering the pumping velocity and many other auxiliary devices may also be used to realize the balancing.

Figure 1:
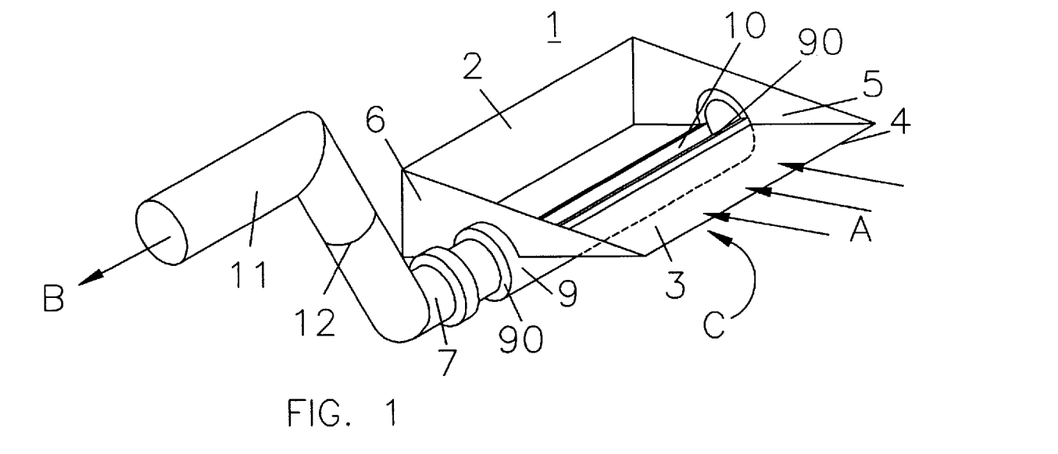
FIG. 1 is a schematic perspective view of a collecting container according to the invention.
Figure 2:
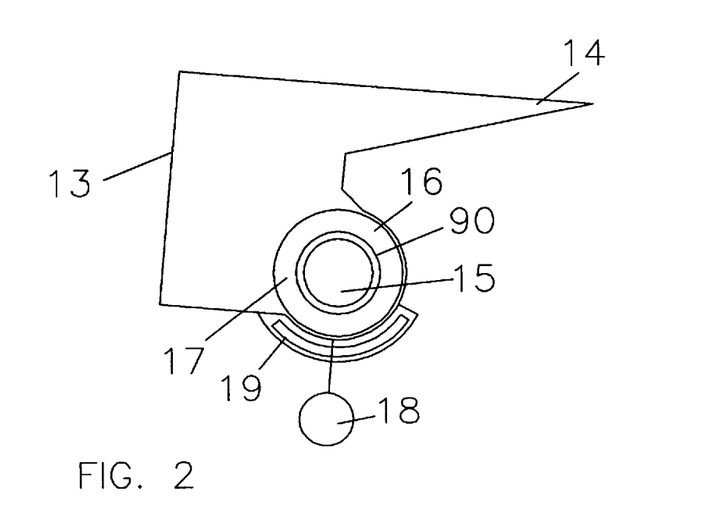
FIG. 2 is a side view of the collecting container of FIG. 1, with a counterweight mass.
Figure 3:
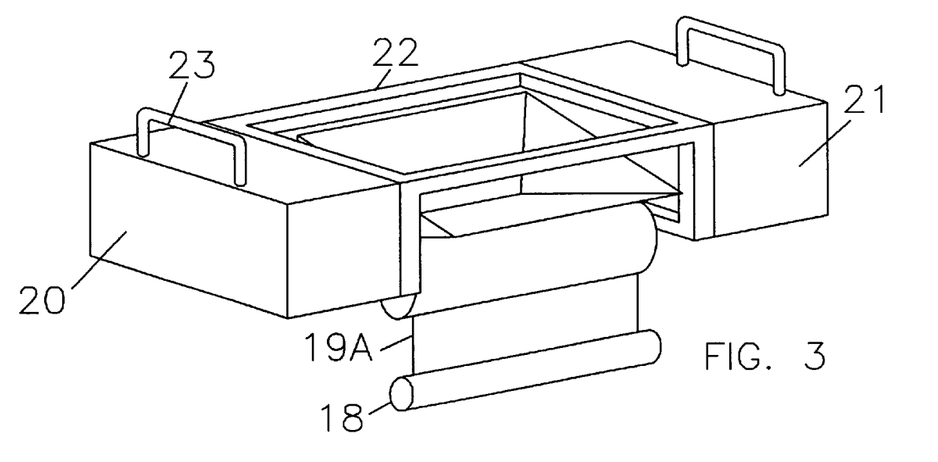
FIG. 3 is a schematic perspective view of a collecting container according to FIG. 2, supported between two identical floating elements.

In FIG. 2 a side view of a collecting container 13 with overflow edge 14 and the axis 15 of the hollow discharge pipe 16 around which the pipe guide 17 fits are shown. The position of the counterweight mass 18 for the empty collecting container 13 may be adjusted by means of an attachable angular position indicator 19. In FIG. 3 the counterweight mass 18 is shown, which is located on the bottom side of a wide plate 19A which is located along the width of the collecting container 13. In another application of the improved features to a skimming device, the improved device or collecting container 13 is incorporated with on either side floating elements 20 and 21, which are firmly interconnected generally rectangular support frame 22. The discharge pipe 16 is located in both floating elements 20 and 21 and with regard to this no further details are required, because one skilled in the art will understand the tilting operation of the collecting container 13 around the discharge pipe 16 in this description.

Figure 4:
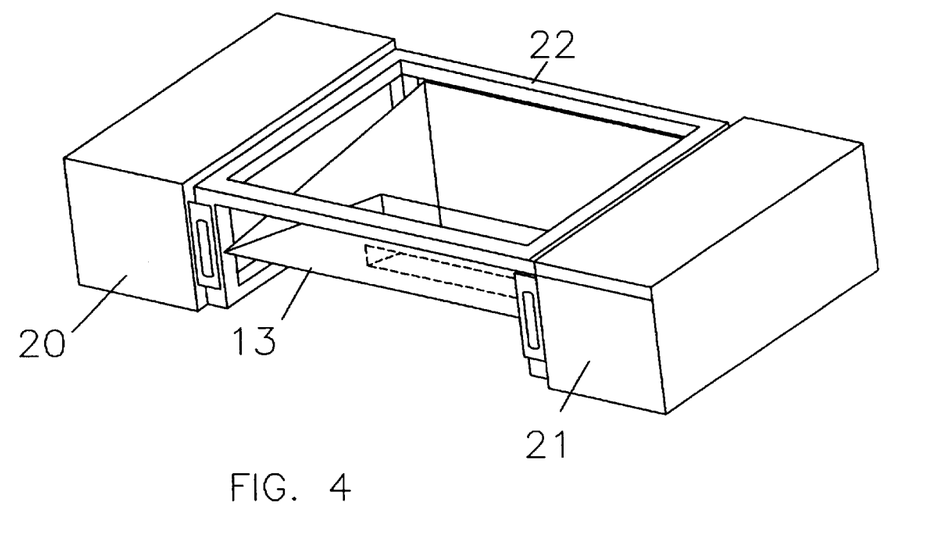
FIG. 4 is a schematic perspective top view of the collecting container according to FIG. 3.
Figure 5:
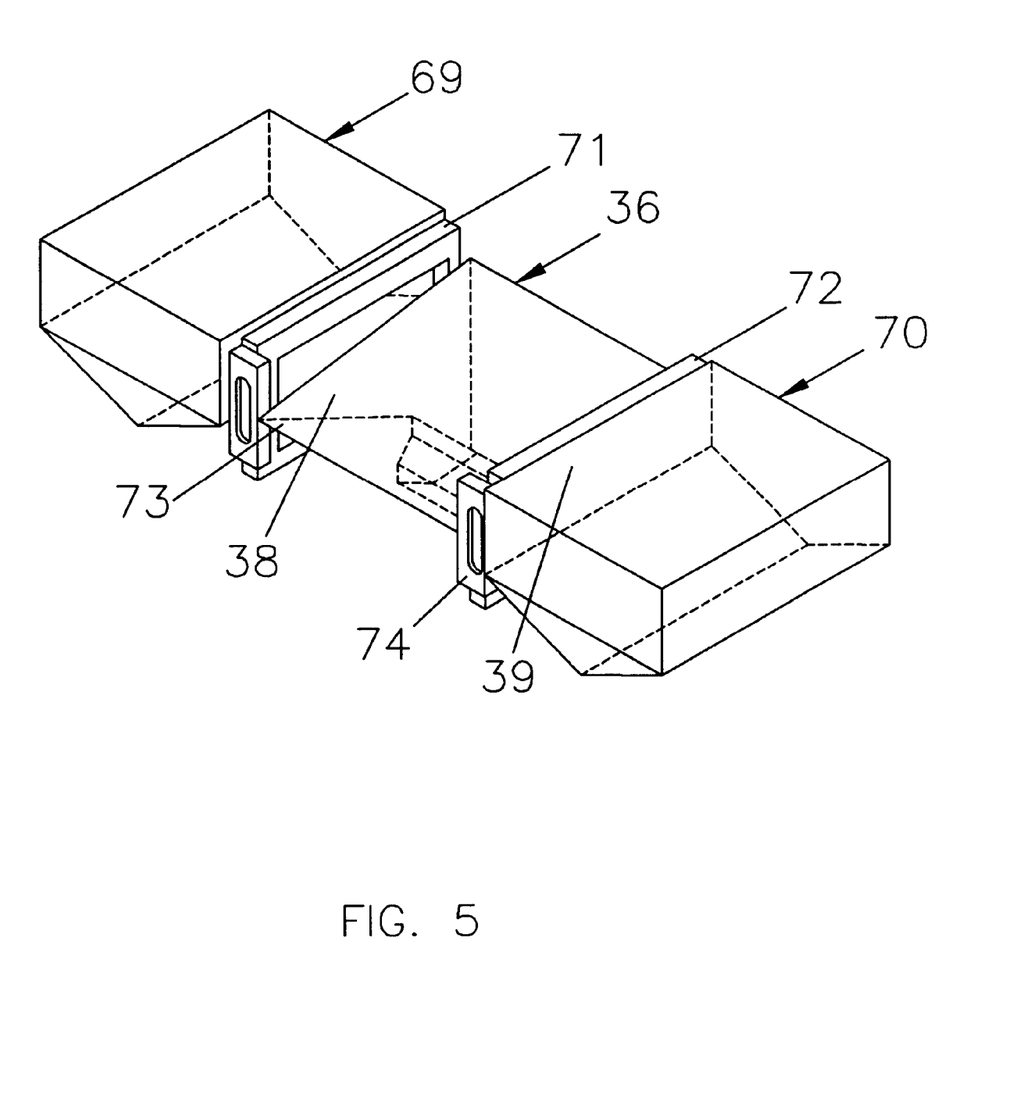
FIG. 5 is a perspective view of an embodiment according to the invention incorporated into a skimming container mounted between two floating elements.

In FIG. 4, schematically the construction of the frame 22 in relation to the floating elements 20 and 21 is clearly shown. The levers 23 in FIG. 3 enhance the maneuverability of the floating structure.

Figure 6:
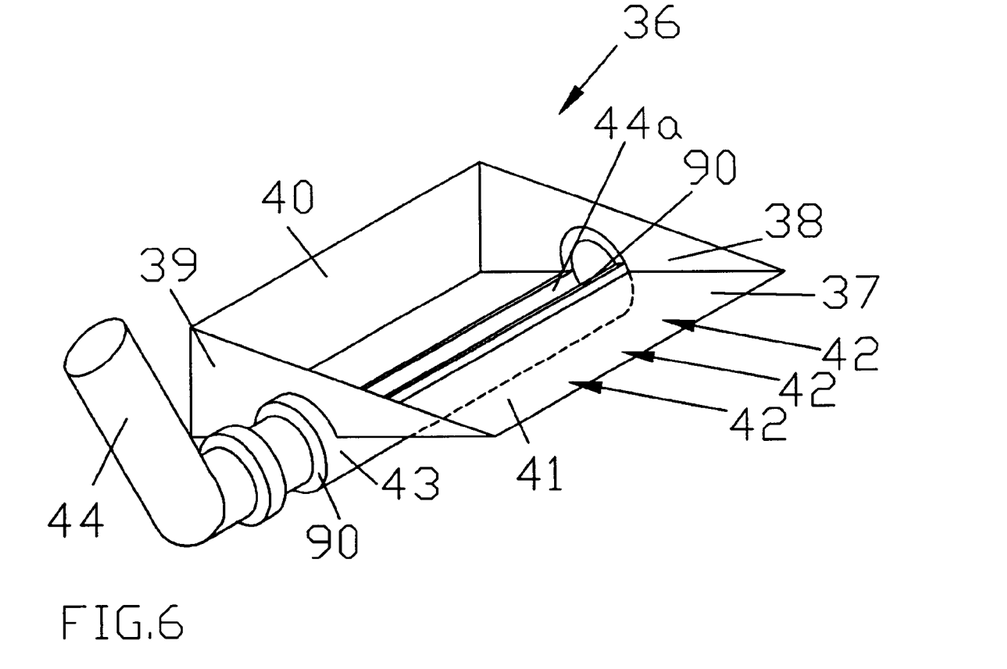
FIG. 6 is a perspective view of a skimming off container according to the invention.

According to FIG. 6 a skimming off container 36 is made of an appropriate material, usually stainless steel and it mainly consists of a bottom plate 37, raised side walls 38 and 39 and also a rear wall 40. The edge for skimming off 41 of the bottom plate 37 is directed to the flow of waste water which is symbolized by the arrows 42. The bottom side of the skimming off container 36 merges into a recessed part 43 in which a discharge pipe 44 is mounted. The discharge pipe 44 is supported in the side walls 38, 39, in such a way that the container 36 is tiltable around the pipe 44. According to the invention, the pipe 44 is provided with a n aperture 44a, which in this embodiment is provided longitudinally in relation to pipe 44 within container 36. The dimension of the pipe 44 and its aperture 44a is such like that the angle or direction and its extent to tilting the container 36 is defined by the difference between the volume of inflowing skimmed off layers into the container and the volume which may be discharged through the pipe 44. Aperture 44a opening may be provided in the form of a slot, one or more slots, or a plurality of holes.

Figure 7:
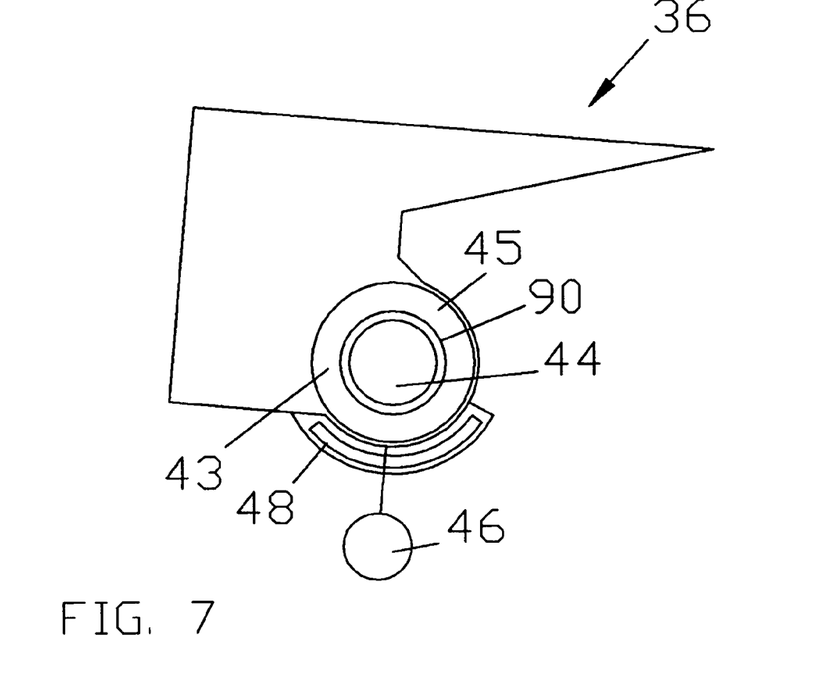
FIG. 7 is a side view of the skimming off container according to FIG. 6.

FIG. 7 is a side view of the skimming off container 36 in which the discharge pipe 44 is supported in the recessed part 43 of the container 36. It is favorable that around the pipe 44 and to the wall 39, a bearing and sealing ring 45 is mounted to serve as an axle/hub bearing means. Futhermore, in this floating embodiment of the invention, a flexible discharge pipe is typically coupled to the supported part of pipe 44. This enables the container 36 to tilt around the discharge pipe 44 almost without friction or disturbance. The recessed part 43 of the container 36 furthermore is provided with an adjustable (counter) weight mass 46, which is attached to a blade 47 on a certain distance of the bottom side of the container 36. Depending on the kind of layers to be skimmed off or the flow of waste water, the weight 46 may be adjusted over the adjustment curve 48 in order to obtain the correct position of the skimming off container 36.

Figure 8:
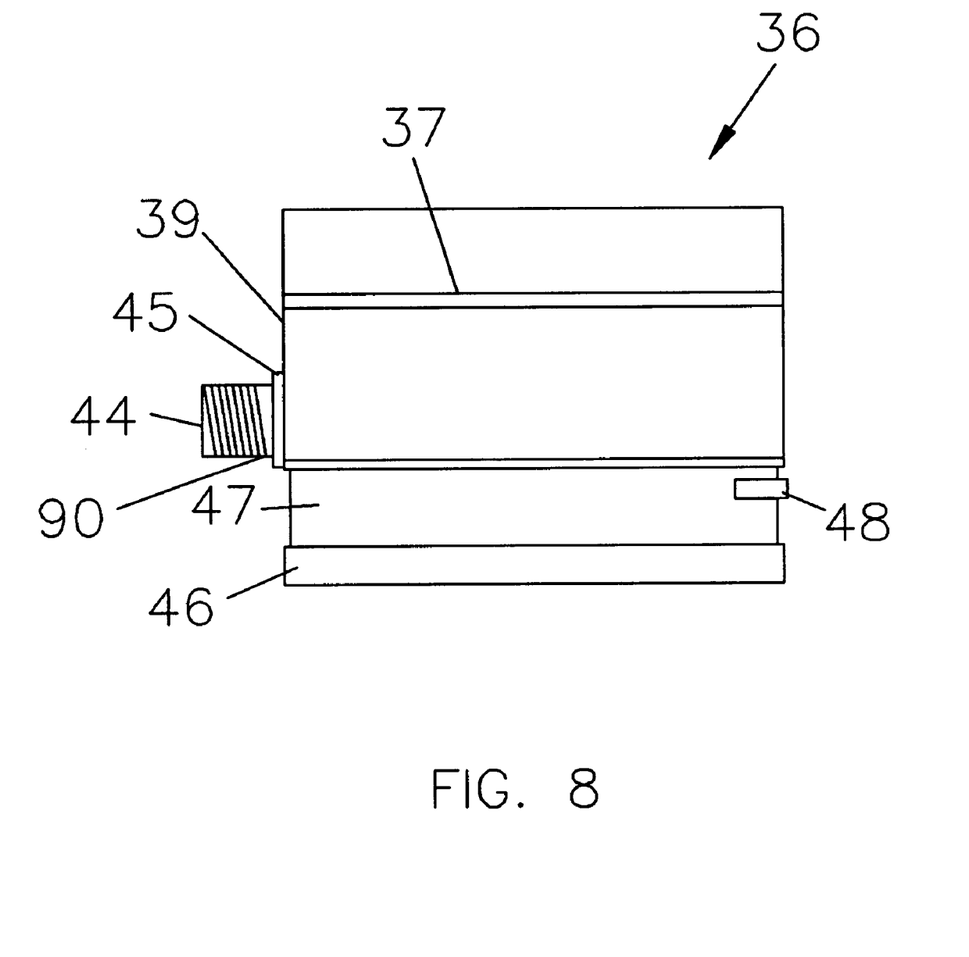
FIG. 8 is a front view of the skimming off container according to FIG. 7.

FIG. 8 is a view according to the arrows VII—VII in FIG. 7, in which in particular is shown that preferably the pipe 44 consists of a shaft butt or connecting sleeve for e.g. a flexible connecting piping (not shown) of which the coupling part may be located against the ring 45 in such a way that the tilting movements of the container 36 can not be influenced by connected piping.

Figure 9:
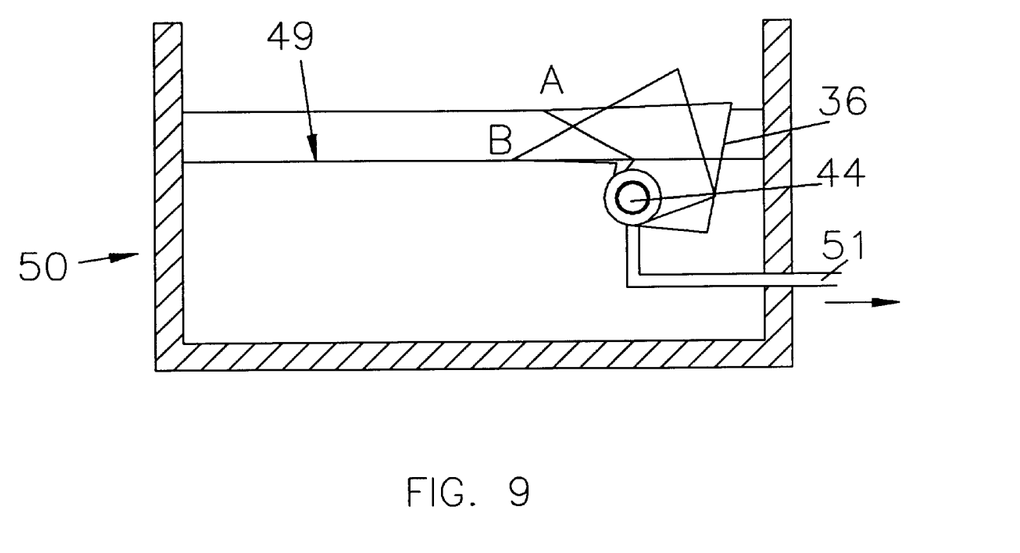
FIG. 9 is a schematic side view of the operating position of the device according to the invention.

FIG. 9 schematically shows the operation of the skimming off container 36 in a flowstream 49 to be skimmed off, which is shown in a container 50. Thereby the position A of the container 36 is the initial position, whereafter the container returns to position B after skimming off. Meanwhile the skimmed off layers are transported through the tiltable pipe 44 and its inter connected discharge pipe 51 to a separator device.

Figure 11:
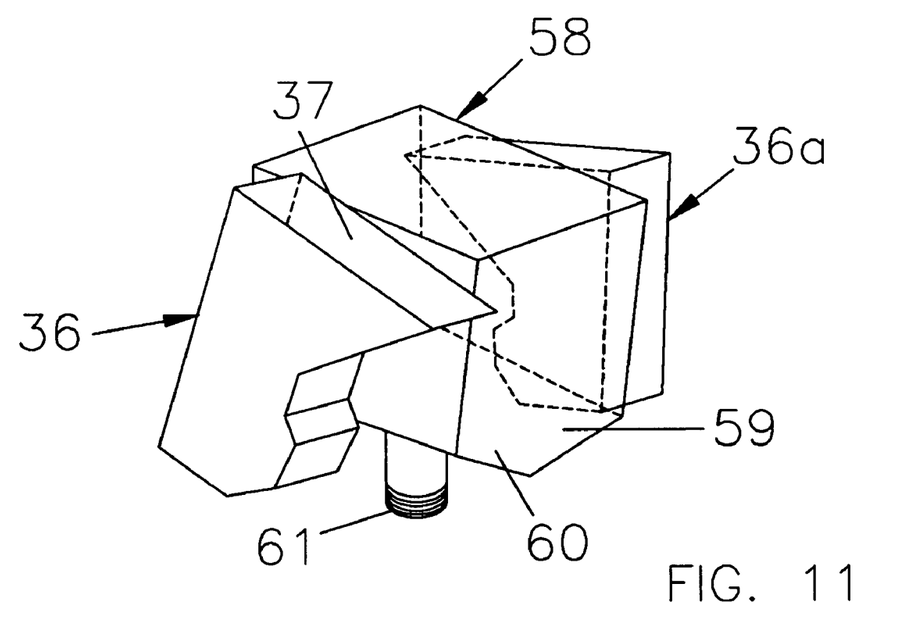
FIG. 11 is a perspective view of a device in which tiltable skimming off containers are attached to a floating element.

FIG. 11 is a perspective view of an embodiment according to the invention in which skimming off containers 36 and 36a are mounted tiltably on either side of a floating element 58 by means of their connecting sleeves, not observable in the FIG. 11 view. The layers skimmed off by the containers 36, 36a flow through their connecting sleeves into the floating element 58 during operation. In this embodiment the floating element 58 consists of an rectangular container, of which the bottom part consists of two angularly positioned surfaces 59 and respectively 60 and in which in the connecting edge of these surfaces a connecting sleeve 61 is mounted for coupling of e.g. a flexible discharge piping. According to the invention, in this embodiment it is now possible to skim off contaminated top layers effectively even in small or poorly accessible spaces.

Figure 12:
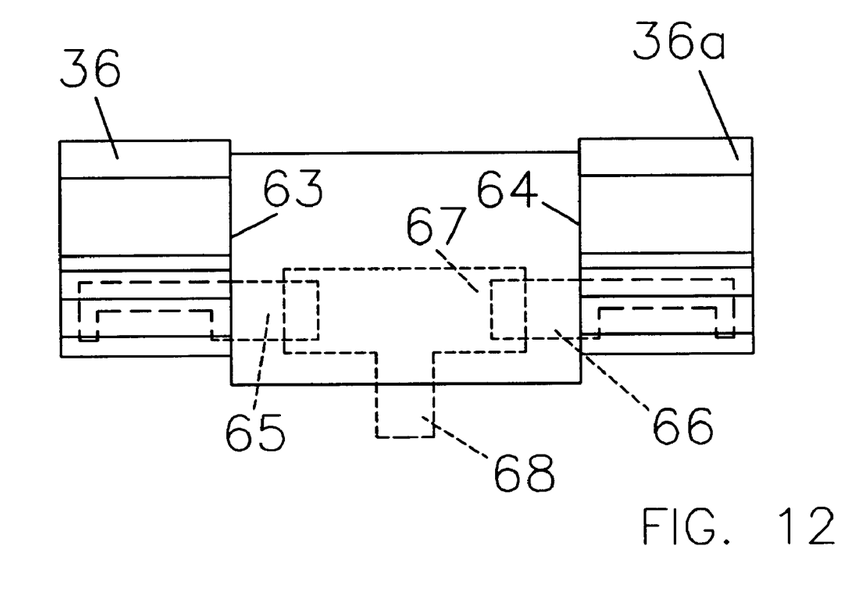
FIG. 12 is a cross sectional view of a floating element to which two skimming off containers are attached at the end portions of a cylindrical floating element.

FIG. 12 is a front view of a device according to the invention provided with a floating element 62 of cylindrical shape, in which skimming off containers 36, 36a are fixedly mounted against the flat side walls 63, 64 by means of the connecting sleeves 65 and 66 respectively. The connecting sleeves 65, 66 are attached to a T-shaped discharge pipe 67, of which the connecting sleeve 68 protruding out of the cylindrically. shaped floating element 62 can be connected to a discharge pipe.

Figure 10:
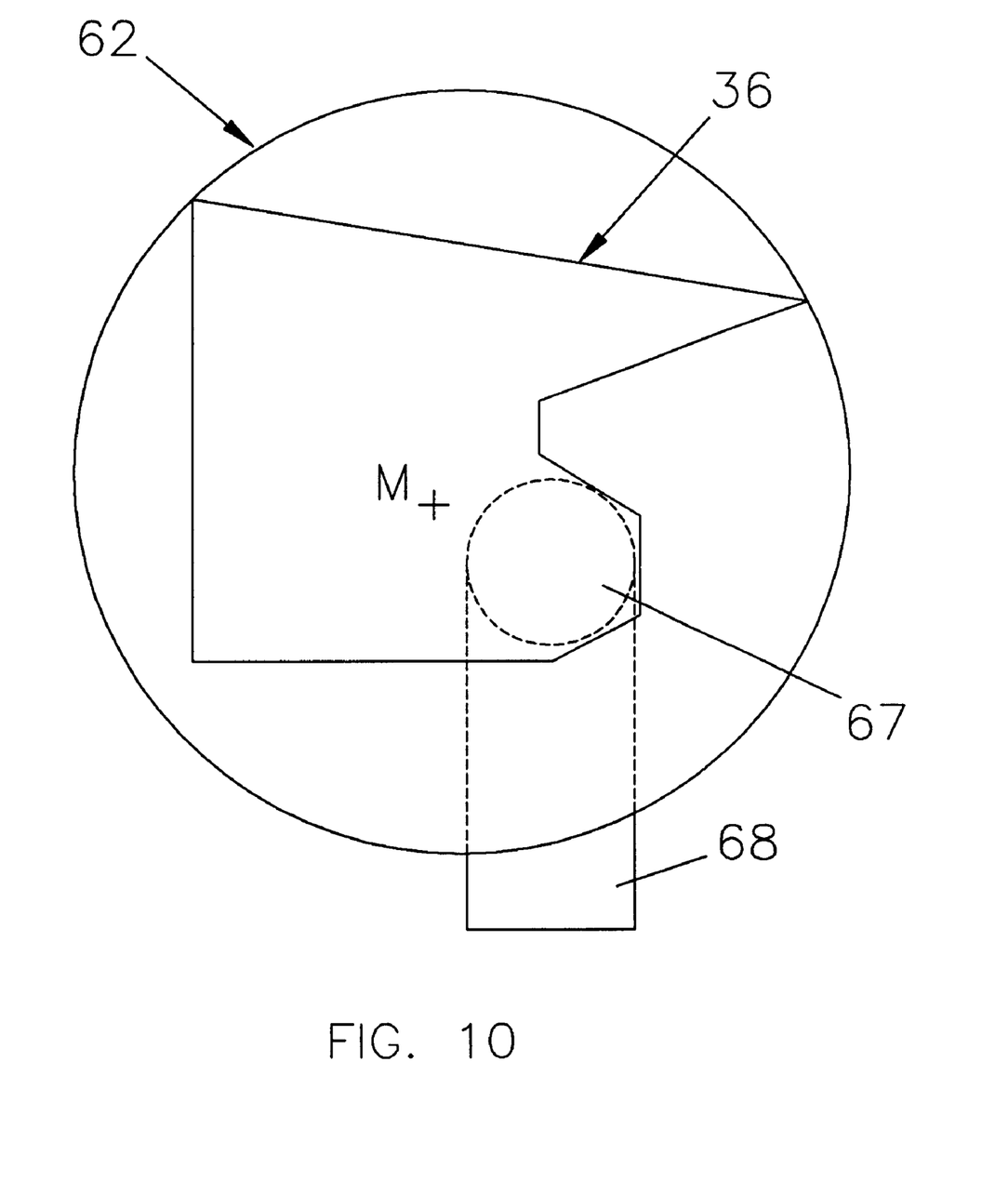
FIG. 10 is a sectional view taken from lines X—X of FIG. 12.

FIG. 10 is a sectional view taken from lines X—X in FIG. 12, in which M is the center of gravity of the cylindrically shaped floating element 62. In this device, in which the skimming off containers 36, 36a are fixedly attached to the floating element 62, the upwardly directed forces influencing the device, resulting from fluctuations of the level in the skimming off containers in which the skimmed off layers are collected, will result in a tilting movement of the complete device 62, 36 and 36a.

FIG. 15 is a perspective view of a device according to the invention, a skimming off container 36 being mounted between two floating elements 69 and 70. The side walls 38, 39 of the container 36 thereby are attached respective support frames 71 and 72. Contrary to the skimming off container according to FIG. 6, this one is provided with a discharge pipe - not shown of which the end portions are attached to both floating elements 69, 70 and in which in the center of the discharge pipe, a connecting sleeve is provided to which a pipe for discharge of the skimmed off layers flowing in the container may be connected. If so desired the attachment of the container 36 to the frames 71, 72 may be adjusted in order to obtain an optimal position in relation to the flow of waste water to be skimmed of; means for adjustment 73, 74 being provided.

The invention is not restricted to the embodiments shown and explained heretofore, because also other combinations being considered with other devices for the separation or skimming off of floating products on wasted waters may be included under the gist of this invention. The invention is clearly new and useful. Moreover, it was not obvious to those of ordinary skill in this art at the time it was made, in view of the prior art considered as a whole as required by law.

It will thus be seen that the objects set forth above, and those made apparent from the foregoing description, are efficiently attained and since certain changes may be made in the above construction without departing from the scope of the invention, it is intended that all matters contained in the foregoing construction or shown in the accompanying drawings shall be interpreted as illustrative and not in the limiting sense.

It is also to be understood that the following claims are intended to cover all of the generic and specific features of the invention herein described, and all statements of the scope of the invention which, as a matter of language, might be said to fall therebetween.

What is claimed is:

1. An improved apparatus for continually skimming off a top layer of a body of liquid, in which the apparatus has a self-adjusting movable collecting container with two opposite sidewalls, a rear wall, and a bottom surface, including a discharge means, wherein the collecting container has an edge over which the top layer flows into the collecting container, which top layer is removable through said discharge means and wherein a combined weight of the top layer skimmed into the collecting container and a weight of the movable collecting container itself interacting with a force caused by a buoyancy of the collecting container, the buoyancy being a direct result of a liquid level differential causing flow from the body of liquid into the collecting container, said differential being maintained by a continuous or intermittent removal of the top layer from the collecting container by the discharge means, thereby causing the collecting container to seek an effective balanced position for collecting the top layer, the improvement comprising:

a pipe about which the collecting container is mounted tiltably, said pipe aligning with and coinciding with an axis of rotation of the collecting container, the pipe further being connected to the discharge means inside the collecting container, wherein the pipe and the collecting container are capable of independent movement, and wherein manual or powered adjustments of the collecting container's attitude upon changes in one of a surface level of the body of liquid outside the collecting container, a weight of the top layer inside the collecting container, a change in flow rate of collected top layer being discharged, and any combination of said surface level, weight of top layer inside the collecting container and discharge flow rate change are not required in order to maintain the effective balanced position for collecting the top layer.

2. The improved apparatus according to claim 1, wherein the pipe is fixed in at least one wall of an enclosure containing the body of liquid.

3. The improved apparatus according to claim 1, wherein the pipe is mounted to at least one floating element.

4. The improved apparatus according to claim 3, wherein the tiltable collecting container has at least one floating element pending on either side of the collecting container, the floating elements being mounted by means of a frame structure and the collecting container being capable of maintaining independent rotational movement.

5. The improved apparatus according to claim 3, further comprising two or more collecting containers mounted to the at least one floating element.

6. The improved apparatus according to claim 3, wherein the collecting container is adjustably connected to the at least one floating element.

7. The improved apparatus according to claim 1, wherein a portion of the pipe extending inside the collecting container has means for receiving the top layer being skimmed into the collecting container.

8. The improved apparatus according to claim 7, wherein the means for receiving the top layer being skimmed into the collecting container is at least one aperture through which the collected top layer may enter the pipe.

9. The improved apparatus according to claim 7, wherein the means for receiving the top layer being skimmed into the collecting container is at least one elongate aperture extending over a predetermined width of the collecting container through which the collected top layer may enter the pipe.

10. The improved apparatus according to claim 1, wherein the collecting container tilts about the pipe by bearing means, the pipe and the bearing means having a predetermined clearance therebetween for minimizing frictional contact between the collecting container and the pipe.

11. The improved apparatus according to claim 10, wherein the bearing means is an annular coupling, and the clearance is sufficient to allow leakage flow from the body of liquid into the collecting container.

12. The improved apparatus according to claim 11, wherein the annular coupling is made from a friction reducing material.

13. An improved apparatus for continually skimming off a top layer of a body of liquid, in which the apparatus has a self-adjusting movable collecting container with two opposite sidewalls, a rear wall, and a bottom surface, including a discharge means, wherein the collecting container has an edge over which the top layer flows into the collecting container, which top layer is removable through said discharge means and wherein a combined weight of the top layer skimmed into the collecting container and a weight of the movable collecting container itself interacting with a force caused by a buoyancy of the collecting container, the buoyancy being a direct result of a liquid level differential causing flow from the body of liquid into the collecting container, said differential being maintained by a continuous or intermittent removal of the top layer from the collecting container by the discharge means, thereby causing the collecting container to seek an effective balanced position for collecting the top layer, the improvement comprising:

a pipe about which the collecting container is mounted tiltably, said pipe aligning with an axis of rotation of the collecting container, the pipe further being connected to the discharge means inside the collecting container, wherein the pipe and the collecting container are capable of independent movement, and wherein the pipe is mounted to at least one floating element.

14. The improved apparatus according to claim 13, wherein the pipe is fixed in at least one wall of an enclosure containing the body of liquid.

15. The improved apparatus according to claim 13, wherein the tiltable collecting container has at least one floating element pending on either side of the collecting container, the floating elements being mounted by means of a frame structure and the collecting container being capable of maintaining independent rotational movement.

16. The improved apparatus according to claim 13, wherein a portion of the pipe extending inside the collecting container has means for receiving the top layer being skimmed into the collecting container.

17. The improved apparatus according to claim 16, wherein the means for receiving the top layer being skimmed into the collecting container is at least one aperture through which the collected top layer may enter the pipe.

18. The improved apparatus according to claim 16, wherein the means for receiving the top layer being skimmed into the collecting container is at least one elongate aperture extending over a predetermined width of the collecting container through which the collected top layer may enter the pipe.

19. The improved apparatus according to claim 13, wherein the collecting container tilts about the pipe by bearing means, the pipe and the bearing means having a predetermined clearance therebetween for minimizing frictional contact between the collecting container and the pipe.

20. The improved apparatus according to claim 19, wherein the bearing means is an annular coupling, and the clearance is sufficient to allow leakage flow from the body of liquid into the collecting container.

21. The improved apparatus according to claim 20, wherein the annular coupling is made from a friction reducing material.

22. The improved apparatus according to claim 13, further comprising two or more collecting containers mounted to the at least one floating element.

23. The improved apparatus according to claim 13, wherein the collecting container is adjustably connected to the at least one floating element.

* * * * *

UNITED STATES PATENT AND TRADEMARK OFFICE
CERTIFICATE OF CORRECTION

PATENT NO.    : 6,287,460 B1
DATED         : September 11, 2001
INVENTOR(S)   : Lodewijk Van Schie It is certified that error appears in the above-identified patent and that said Letters Patent is hereby corrected as shown below:

Column 2,
Line 44, replace "rotable" with -- rotatable --.

Column 8,
Line 5, replace "In FIG. 2 a side view" with -- In FIG. 2, a side view --.

Column 9,
Line 44, replace "15" with -- 5 --.

Signed and Sealed this

Twenty-sixth Day of February, 2002

Attest:

JAMES E. ROGAN
*Director of the United States Patent and Trademark Office*

*Attesting Officer*